(12) United States Patent
Saito

(10) Patent No.: US 12,409,699 B2
(45) Date of Patent: Sep. 9, 2025

(54) STABILIZER CONTROL DEVICE

(71) Applicant: TOYOTA JIDOSHA KABUSHIKI KAISHA, Toyota (JP)

(72) Inventor: Takashi Saito, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/888,524

(22) Filed: Sep. 18, 2024

(65) Prior Publication Data

US 2025/0206097 A1  Jun. 26, 2025

(30) Foreign Application Priority Data

Dec. 20, 2023 (JP) ................. 2023-214507

(51) Int. Cl.
*B60G 21/02* (2006.01)

(52) U.S. Cl.
CPC .................. *B60G 21/026* (2013.01)

(58) Field of Classification Search
CPC ...... B60T 11/103; B60G 2300/14; B62D 9/02
See application file for complete search history.

(56) References Cited

U.S. PATENT DOCUMENTS

| | | | | |
|---|---|---|---|---|
| 6,825,628 B2 * | 11/2004 | Heigl | .................. | H02H 7/0851 |
| | | | | 414/921 |
| 7,684,915 B1 * | 3/2010 | Dailey | .................. | A61G 3/061 |
| | | | | 414/921 |
| 9,908,531 B1 * | 3/2018 | Claywell | ........... | B60W 50/0098 |
| 9,992,461 B1 * | 6/2018 | Schreiber | ........... | G01C 21/3602 |
| 10,336,188 B2 * | 7/2019 | Torii | ..................... | B60K 28/02 |
| 10,740,631 B2 * | 8/2020 | Ali | ......................... | F02D 41/26 |
| 10,755,122 B2 * | 8/2020 | Ali | .................... | G08B 13/19613 |
| 10,776,640 B2 * | 9/2020 | Ali | ......................... | G06V 20/59 |
| 11,572,084 B2 * | 2/2023 | MacPherson | ......... | B60G 11/27 |
| 2011/0208391 A1 | 8/2011 | Mizuta et al. | | |
| 2017/0057519 A1 * | 3/2017 | Ungetheim | ............ | A61G 3/061 |
| 2017/0349145 A1 * | 12/2017 | Tanabe | ................. | B60R 25/257 |
| 2018/0065641 A1 * | 3/2018 | Claywell | ........... | B60W 50/0098 |
| 2018/0197027 A1 * | 7/2018 | Ali | ......................... | F02D 41/042 |
| 2018/0197028 A1 * | 7/2018 | Ali | ......................... | G06F 18/22 |
| 2018/0197029 A1 * | 7/2018 | Ali | ......................... | G06V 20/59 |
| 2018/0264940 A1 * | 9/2018 | Torii | ..................... | G08G 1/166 |
| 2021/0155264 A1 * | 5/2021 | MacPherson | ......... | A61G 3/065 |

FOREIGN PATENT DOCUMENTS

| | | | |
|---|---|---|---|
| DE | 102020006712 A1 * | 1/2021 | |
| FR | 3079778 A3 * | 10/2019 | ........... B60G 17/018 |
| JP | 5321603 B2 | 10/2013 | |

* cited by examiner

*Primary Examiner* — Paul N Dickson
*Assistant Examiner* — Maxwell L Meshaka
(74) *Attorney, Agent, or Firm* — SoraIP, Inc.

(57) ABSTRACT

The present disclosure relates to a stabilizer control device. In the stabilizer control device, a control unit is configured to operate an actuator of an active stabilizer of a vehicle and tilt a vehicle body of the vehicle to a right side or a left side when a user gets in and out of the vehicle.

2 Claims, 8 Drawing Sheets

RIGHT　　　　　　　　　　　　　　　　　　LEFT

STABILIZER CONTROL DEVICE

CROSS-REFERENCE TO RELATED APPLICATION

This application claims priority to Japanese Patent Application No. 2023-214507 filed on Dec. 20, 2023, incorporated herein by reference in its entirety.

BACKGROUND

1. Technical Field

The present disclosure relates to a stabilizer control device.

2. Description of Related Art

Japanese Patent No. 5321603 (JP 5321603 B) discloses a stabilizer control device for a vehicle that variably controls torsional rigidity of a stabilizer provided between right and left wheels of the vehicle. With this technology, it is possible to achieve both steering stability and ride comfort.

SUMMARY

In a vehicle such as a sport utility vehicle (SUV) having a relatively large vehicle height, a short person may have difficulty in getting in and out of the vehicle. There is a vehicle capable of, to facilitate getting in and out of the vehicle, reducing the vehicle height by controlling an air suspension or an active suspension when a user gets in and out of the vehicle.

The inventors have recognized a demand in a vehicle including an active stabilizer to improve ease of getting in and out of the vehicle without using an air suspension or an active suspension.

An object of the present disclosure is to provide a technology for improving ease of getting in and out of a vehicle including an active stabilizer.

In order to achieve the above object,
a stabilizer control device according to an aspect of the present disclosure includes a control unit configured to operate an actuator of an active stabilizer of a vehicle and tilt a vehicle body of the vehicle to a right side or a left side when a user gets in and out of the vehicle.

According to the present disclosure, it is possible to provide the technology for improving the ease of getting in and out of the vehicle including the active stabilizer.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
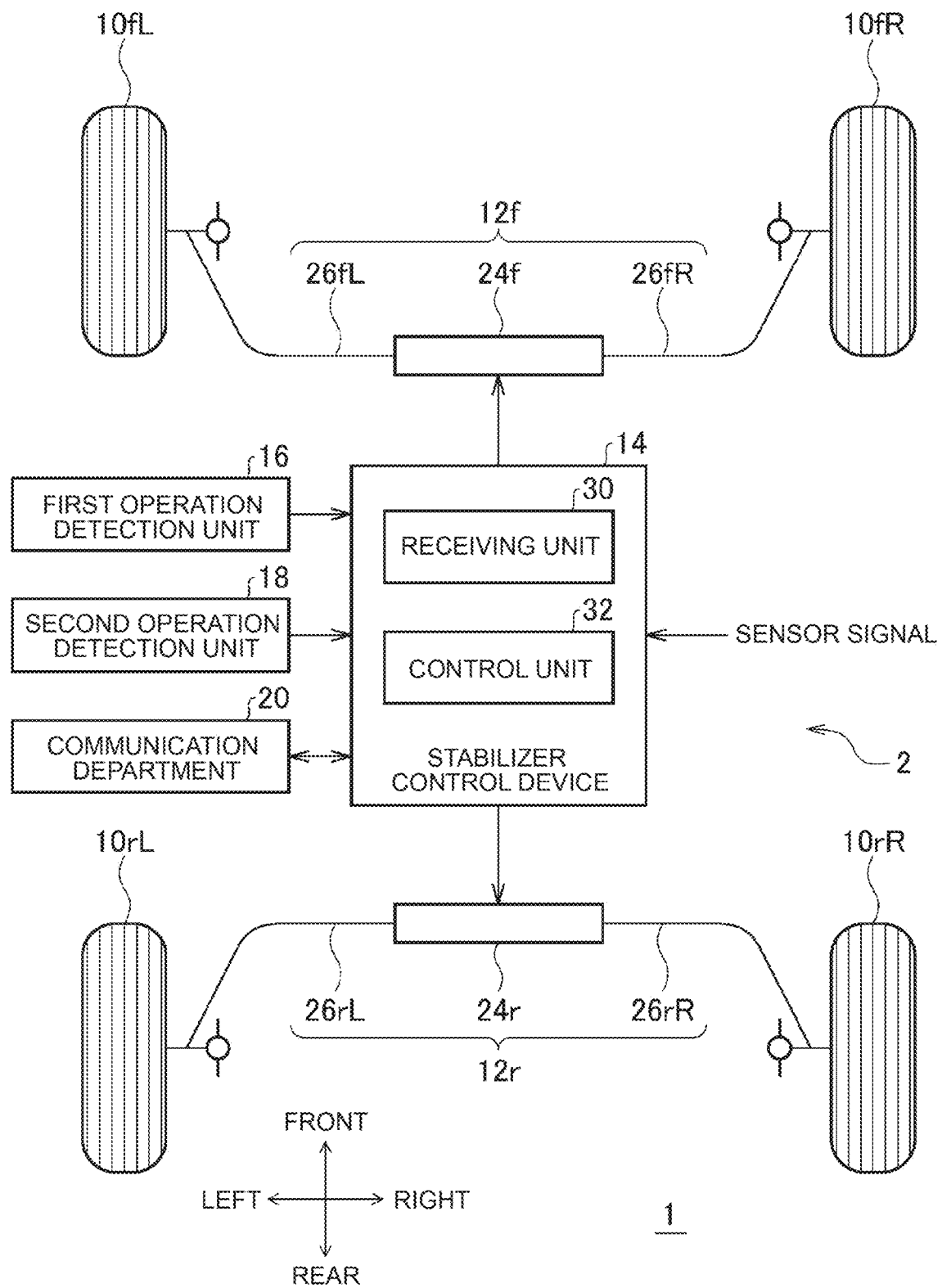
FIG. 1 is a diagram illustrating a schematic configuration of a vehicle according to a first embodiment.

FIG. 1 shows a schematic configuration of a vehicle 1 according to a first embodiment. The vehicle 1 includes a left front wheel 10$f$L, a right front wheel 10$f$R, a left rear wheel 10$r$L, a right rear wheel 10$r$R, and a vehicle control system 2. The vehicle control system 2 includes a first active stabilizer 12$f$, a second active stabilizer 12$r$, a stabilizer control device 14, a first operation detection unit 16, a second operation detection unit 18, and a communication unit 20. Hereinafter, the first active stabilizer 12$f$ and the second active stabilizer 12$r$ will be collectively referred to as the active stabilizer 12 as appropriate.

The first active stabilizer 12$f$ is provided between the left front wheel 10$f$L and the right front wheel 10$f$R. The second active stabilizer 12$r$ is provided between the left rear wheel 10$r$L and the right rear wheel 10$r$R. The active stabilizer 12 extends in the vehicle width direction of the vehicle 1.

The first active stabilizer 12$f$ has an actuator 24$f$, a left stabilizer bar 26$f$L, and a right stabilizer bar 26$f$R. One end of the right stabilizer bar 26$f$R is connected to a wheel holding member that holds the right front wheel 10$f$R. One end of the left stabilizer bar 26$f$L is connected to a wheel holding member that holds the left front wheel 10$f$L. The other end of the right stabilizer bar 26$f$R and the other end of the left stabilizer bar 26$f$L are connected to each other via an actuator 24$f$ so as to be relatively rotatable. The actuator 24$f$ includes a motor, and is capable of rotating the left stabilizer bar 26$f$L and the right stabilizer bar 26$f$R in opposite directions. When the actuator 24$f$ is operated, the left stabilizer bar 26$f$L and the right stabilizer bar 26$f$R are relatively rotated. The elastic force when viewed in the entire first active stabilizer 12$f$ changes, and the rolling of the vehicle body can be suppressed while the vehicle 1 is traveling.

Similarly, the second active stabilizer 12$r$ has an actuator 24$r$, a left stabilizer bar 26$r$L, and a right stabilizer bar 26$r$R. One end of the right stabilizer bar 26$r$R is connected to a wheel holding member that holds the right rear wheel 10$r$R. One end of the left stabilizer bar 26$r$L is connected to a wheel holding member that holds the left rear wheel 10$r$L. The other end of the right stabilizer bar 26$r$R and the other end of the left stabilizer bar 26$r$L are connected to each other via an actuator 24$r$ so as to be relatively rotatable. The actuator 24$r$ includes a motor, and is capable of rotating the left stabilizer bar 26$r$L and the right stabilizer bar 26$r$R in opposite directions. When the actuator 24$r$ is operated, the left stabilizer bar 26$r$L and the right stabilizer bar 26$r$R are relatively rotated. The elastic force when viewed in the entire second active stabilizer 12$r$ changes, and the rolling of the vehicle body can be suppressed while the vehicle 1 is traveling.

Hereinafter, the actuator 24f and the actuator 24r will be collectively referred to as an actuator 24 as appropriate. The actuator 24 is controlled by a control signal supplied from the stabilizer control device 14. A known configuration can be employed as the active stabilizer 12.

The vehicle 1 is an exemplary vehicle having a relatively high vehicle height such as a SUV or an off-road vehicle. In the vehicle 1, as described above, there is a possibility that a small person is difficult to get on and off. The vehicle 1 includes an active stabilizer 12, but does not include, for example, an air suspension or an active suspension.

In the embodiment, in order to improve the getting on and off performance of the vehicle 1, the vehicle height is changed by using the active stabilizer 12 when the user gets on and off. Specifically, the stabilizer control device 14 operates the actuator 24 of the active stabilizer 12 in response to an operation input of the user when the user gets on and off, inclines the vehicle body of the vehicle 1 to the right side or the left side, and lowers the vehicle height on the right side or the left side of the vehicle 1. This makes it easier for the user to get on and off from the lowered side of the vehicle 1. The user can also be called an occupant. The vehicle height on the right side represents the height from the ground to the lowest portion on the right side of the vehicle body. The vehicle height on the left side represents the height from the ground to the lowest portion on the left side of the vehicle body.

Figure 2A:
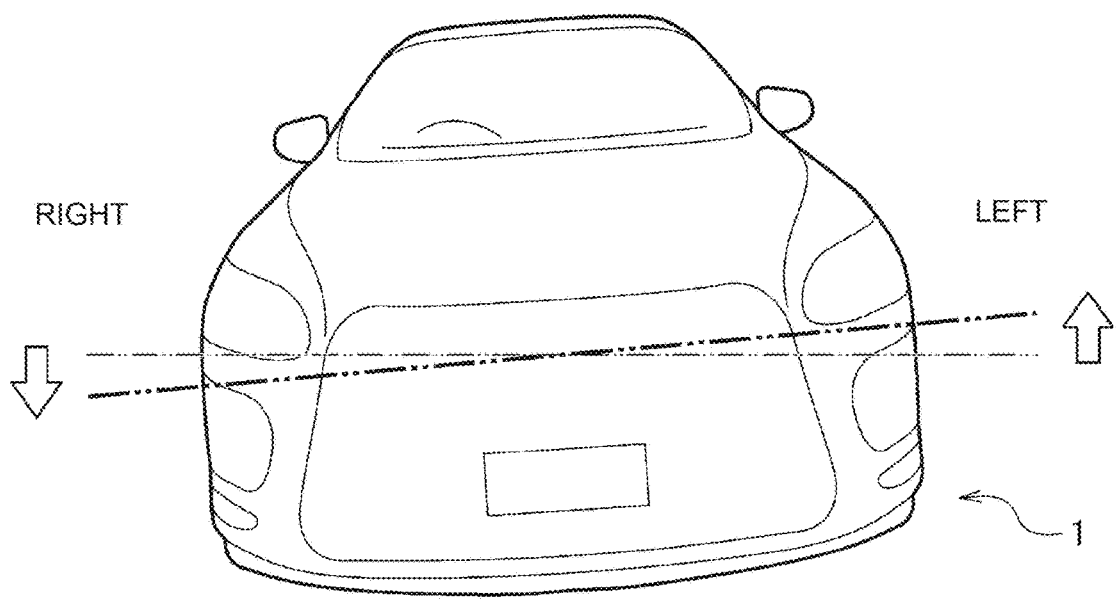
FIG. 2A is a view for explaining a vehicle height adjustment of the vehicle of FIG. 1.
Figure 2B:
FIG. 2B is another view for explaining the vehicle height adjustment of the vehicle of FIG. 1.
Figure 2C:
FIG. 2C is another view for explaining the vehicle height adjustment of the vehicle of FIG. 1.

FIGS. 2A, 2B and 2C are diagrams for explaining the adjusting of the vehicle height of the vehicle 1 in FIG. 1. FIG. 2A is a front view of vehicle 1 with the vehicle body tilted. When the actuator 24 of the active stabilizer 12 operates, the vehicle body of the vehicle 1 is inclined to the right, the vehicle height on the right side of the vehicle 1 is lowered, and the vehicle height on the left side of the vehicle 1 is raised. Since the active stabilizer 12 connects the left and right wheels, lowering one side of the vehicle body raises the opposite side of the vehicle body. Therefore, it is possible to adjust the vehicle height on one side of the right and left sides to a desired height that is easy to get on and off.

FIG. 2B is a partial side view illustrating a manner in which a user rides in the vehicle 1 in which the vehicle body is not tilted. In FIG. 2B, the vehicle height on the left side and the vehicle height on the right side of the vehicle 1 are approximately the same.

FIG. 2C is a partial side view illustrating a manner in which a user rides on a vehicle 1 in which a vehicle body is inclined. In FIG. 2C, the vehicle body of the vehicle 1 is inclined to the left side of the user, and the vehicle height on the left side of the vehicle 1 is lowered as compared with the condition shown in FIG. 2B. In the state shown in FIG. 2C, compared with the state shown in FIG. 2B, the user can ride by lifting his/her feet lower, and the user can easily ride in an easy position.

As described above, in the embodiment, it is possible to enhance the getting-on/off performance of the vehicle 1 including the active stabilizer 12. Since the getting-on and getting-on performance can be improved without adding an air suspension or an active suspension, an increase in cost of the vehicle 1 can also be suppressed. Hereinafter, embodiments will be described in more detail.

Figure 3:
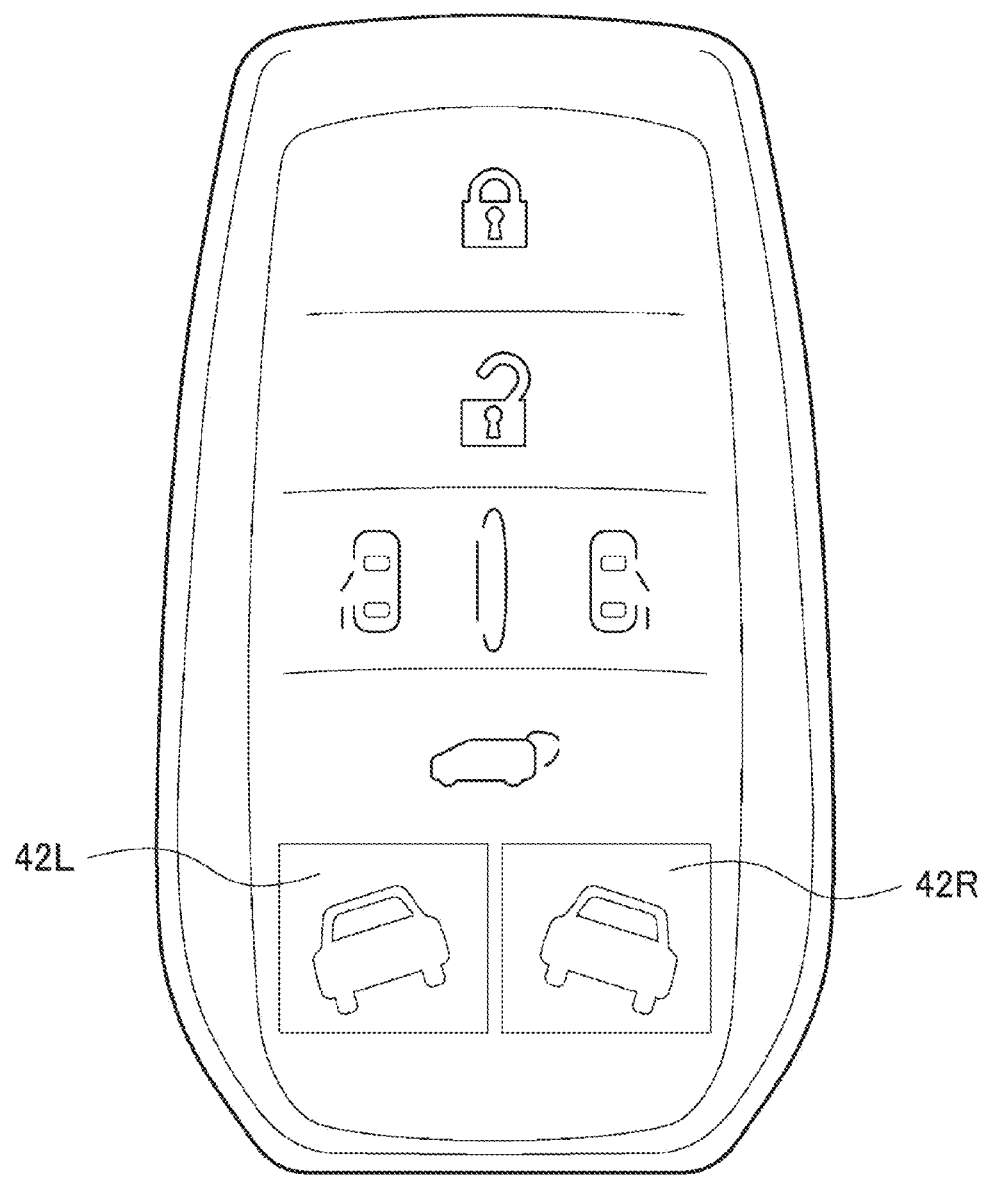
FIG. 3 is a plan view illustrating an example of the electronic key according to the first embodiment.

FIG. 3 is a plan view illustrating an example of the electronic key 40 according to the first embodiment. The electronic key 40 is carried by a user of the vehicle 1. The electronic key 40 includes a plurality of buttons that can be operated by a user as an operation input unit. The plurality of buttons differs from known electronic keys in that they include a button 42R for tilting the vehicle body to the right and a button 42L for tilting the vehicle body to the left. The button 42R for tilting the vehicle body to the right side may also be referred to as a button for lowering the vehicle height on the right side. The button 42L for tilting the vehicle body to the left side may also be referred to as a button for lowering the vehicle height on the left side. In addition, the plurality of buttons may include known buttons, such as a locking button and an unlocking button.

The electronic key 40 is capable of performing short-range wireless communication with the communication unit 20 of the vehicle 1. Various known techniques can be used for wireless communication between the communication unit 20 and the electronic key 40. Upon receiving the request from the communication unit 20, the electronic key 40 transmits a unique key identifier to the communication unit 20. When the received key identifier matches an identifier registered in advance, the communication unit 20 determines that authentication is successful, and makes it possible to accept an operation such as an unlock button provided on a door of the vehicle 1, for example. When a button is pressed by the user, the electronic key 40 transmits operation information corresponding to the pressed button to the communication unit 20 of the vehicle 1. A key identifier is attached to the transmitted operation information. When the received key identifier matches an identifier registered in advance, the communication unit 20 supplies the received manipulation information to each ECU and the like of the vehicle 1. When the received key identifier does not match the previously registered identifier, the communication unit 20 discards the received operation information. Therefore, the vehicle 1 cannot be operated except for the electronic key 40 registered in advance.

When the button 42R is pressed, the electronic key 40 transmits first operation data indicating that a user operation of tilting the vehicle body to the right side has been performed to the communication unit 20. When the button 42L is pressed, the electronic key 40 transmits, to the communication unit 20, second operation data indicating that a user operation of tilting the vehicle body to the left side has been performed.

Although not shown, in a smartphone, a tablet terminal, or the like, which is a portable terminal carried by a user of the vehicle 1, when an application for vehicle operation is activated, a plurality of button images capable of touch operation, similar to the plurality of buttons in FIG. 3, may be displayed on the display. The plurality of button images includes a button image for tilting the vehicle body to the right and a button image for tilting the vehicle body to the right. When a button image is touched by the user, the mobile terminal transmits operation information corresponding to the touched button image to the communication unit 20 of the vehicle 1. The portable terminal also holds a unique key identifier, and the vehicle 1 cannot be operated except for the portable terminal registered in advance. Since various known techniques can be used as the basic configuration and function of the electronic key 40 and the portable terminal, further detailed description thereof will be omitted. Hereinafter, the electronic key 40 and the portable terminal may be collectively referred to as an electronic key 40 or the like.

Return to FIG. 1. The first operation detection unit 16 detects that the doorknob on the outside or the inside of the door on the right side of the vehicle 1 has been operated, and when detecting the operation, supplies the first operation information to the stabilizer control device 14.

The second operation detection unit 18 detects that the doorknob on the outside or the inside of the door on the left side of the vehicle 1 has been operated, and when detecting the operation, supplies the second operation information to the stabilizer control device 14. The operation of the doorknob may be a touch operation.

When the authentication is successful, the communication unit 20 supplies the first operation information or the second operation information received from the electronic key 40 or the like to the stabilizer control device 14.

The stabilizer control device 14 includes a receiving unit 30 and a control unit 32. The configuration of the stabilizer control device 14 may be implemented by hardware, a CPU of any computer, a memory, or another LSI, and may be implemented by software, a program loaded into the memory, or the like. Here, functional blocks realized by the cooperation are depicted. Therefore, those skilled in the art will understand that the functional blocks can be realized in various forms by hardware only, software only, or a combination thereof. The stabilizer control device 14 can be configured as, for example, an electronic control unit (ECU).

The stabilizer control device 14 controls the actuator 24 of the active stabilizer 12 during traveling of the vehicle 1, and executes known roll suppression control and the like. On the other hand, when a predetermined user operation is performed while the vehicle 1 is stopped, the stabilizer control device 14 controls the actuator 24 to perform control for tilting the vehicle body.

Upon receiving the first operation information from the first operation detection unit 16 or the communication unit 20, the receiving unit 30 receives a user operation of tilting the vehicle body to the right. Upon receiving the second operation information from the second operation detection unit 18 or the communication unit 20, the receiving unit 30 receives a user operation of tilting the vehicle body to the left side.

The control unit 32 operates the actuator 24 to tilt the vehicle body of the vehicle 1 to the right side or the left side when the user gets on and off. Specifically, when a user operation is received by the receiving unit 30, the control unit 32 tilts the vehicle body toward the side designated by the user operation. When the receiving unit 30 receives a user operation of tilting the vehicle body to the right, the control unit 32 operates the actuator 24 so as to tilt the vehicle body to the right. When the receiving unit 30 receives a user operation of tilting the vehicle body to the left, the control unit 32 operates the actuator 24 so as to tilt the vehicle body to the left.

For example, the right-side or left-side vehicle height may be adjusted in the order of several cm, and may be less than or equal to 4 cm, depending on the vehicle type. The amount of operation of the actuator 24 can be appropriately determined by experiment or simulation.

The control unit 32 may tilt the vehicle body when a user operation is received by the receiving unit 30 only when a predetermined getting-on/off condition indicating that the vehicle 1 can get on/off is satisfied. The getting on and off condition may be, for example, that the door of the vehicle 1 is unlocked, the shift lever of the vehicle 1 is in the parking range, and the parking brake is activated. The control unit 32 can determine whether or not the getting-on and getting-on condition is satisfied based on various sensor signals supplied from the respective units of the vehicle 1. Various known conditions may be used as the getting on and off conditions. Thus, even if a person who is not a user operates the doorknob in a state where the door of the vehicle 1 is locked, the control of tilting the vehicle body is not executed. In addition, even when a user operation is received while the vehicle 1 is traveling, it is possible to prevent the control of tilting the vehicle body according to the user operation from being executed.

For example, when the user rides on the seat on the right side of the vehicle 1 at a stop, the actuator 24 operates when the doorknob on the outside of the door is operated in order to open the door on the right side of the vehicle 1. Then, the left stabilizer bar 26fL and the right stabilizer bar 26fR are relatively rotated, the left stabilizer bar 26rL and the right stabilizer bar 26rR are relatively rotated, and the vehicle body is inclined to the right side. The same operation is performed when a button 42R for tilting the vehicle body of the electronic key 40 to the right side is pressed. As a result, the user can easily get into the seat on the right side from the right side of the lowered vehicle body.

Since the actuator 24 operates with the driving force of the motor, the adjustment of the vehicle height can be completed in a shorter time than in the case where the vehicle height is adjusted by the air suspension. For example, the adjustment of the vehicle height may be completed in 1 second or less after the doorknob is operated. Therefore, it is highly convenient.

The control unit 32 may operate the actuator 24 so as to tilt the vehicle body, and then detect that the user has ridden on the vehicle based on various sensor signals. When the predetermined ride completion condition is satisfied, the control unit 32 may detect that the user has ridden. For example, the boarding completion condition may include at least one of the following: the open door is closed, the seat belt of the seat corresponding to the open door is attached, and the seating on the seat is detected. As the boarding completion condition, various known conditions may be used.

After operating the actuator 24 to tilt the vehicle body, the control unit 32 may operate the actuator 24 to remove the tilt of the vehicle body and return the vehicle body to the original state when it is detected that the user has ridden the vehicle. That is, the control unit 32 returns the actuator 24 to the non-operating state. As a result, the vehicle 1 can travel.

After operating the actuator 24 so as to tilt the vehicle body, the control unit 32 may not control the actuator 24 in response to a new user operation and may maintain the current operating state of the actuator 24 even if a new user operation is received by the receiving unit 30 until the user has been detected to have ridden. As a result, it is possible to prevent the vehicle body from moving while the user is riding.

After operating the actuator 24 so as to tilt the vehicle body, when it is detected that the user has ridden the vehicle, the control unit 32 may operate the actuator 24 in accordance with a new user operation when a new user operation is received by the receiving unit 30, and may tilt the vehicle body toward the side designated by the new user operation. This makes it easier for a user different from the first user to get on the vehicle from the opposite side.

Control can be performed in the same manner as described above at the time of getting off. For example, when the user gets out of the seat on the right side of the vehicle 1 at a stop and operates the doorknob inside the door to open the door on the right side of the vehicle 1, the actuator 24 operates and the vehicle body tilts to the right side. As a result, the user can easily get off from the right side of the lowered vehicle body.

The control unit 32 may operate the actuator 24 so as to tilt the vehicle body, and then detect that the user gets off the vehicle based on various sensor signals. When the predetermined getting-off completion condition is satisfied, the control unit 32 may detect that the user gets off. For example, the getting-off completion condition may include at least one of the following: the open door is closed; and the seating of the seat corresponding to the open door is no longer detected. Various known conditions may be used as the getting-off completion condition.

After operating the actuator 24 to tilt the vehicle body, the control unit 32 may operate the actuator 24 to remove the tilt of the vehicle body and return the vehicle body to the original state when it is detected that the user gets off the vehicle.

After operating the actuator 24 so as to tilt the vehicle body, the control unit 32 may not control the actuator 24 according to the new user operation and may maintain the current operation state of the actuator 24 even if a new user operation is accepted by the receiving unit 30 until it is detected that the user gets off. Accordingly, it is possible to prevent the vehicle body from moving while the user is getting off.

After operating the actuator 24 so as to tilt the vehicle body, when it is detected that the user gets off the vehicle, the control unit 32 may operate the actuator 24 in accordance with a new user operation when a new user operation is received by the receiving unit 30, and tilt the vehicle body toward the side designated by the new user operation. This makes it easier for a user different from the first user to get off the vehicle from the opposite side.

Figure 4:
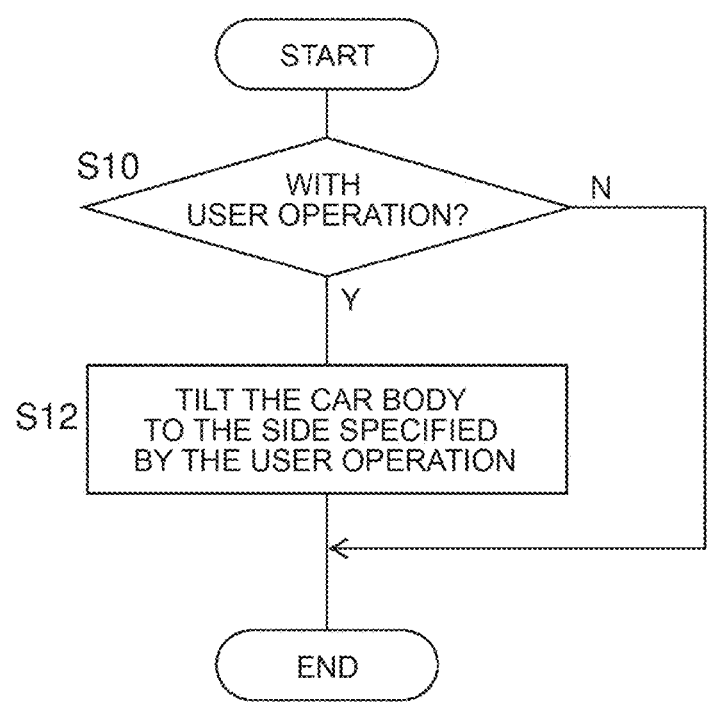
FIG. 4 is a flowchart illustrating processing of the stabilizer control device of FIG. 1.

Next, the overall operation of the stabilizer control device 14 having the above-described configuration will be described. FIG. 4 is a flowchart showing the processing of the stabilizer control device 14 of FIG. 1. The process of FIG. 4 is repeatedly executed.

When there is a user operation (Y in S10), the control unit 32 operates the actuator 24 to tilt the vehicle body toward the side designated by the user operation, and the stabilizer control device 14 ends the process. When there is no user manipulation (N in S10), the stabilizer control device 14 ends the process.

According to the embodiment, since the actuator 24 of the active stabilizer 12 is operated to tilt the vehicle body to the right side or the left side when the user gets on and off, the vehicle height on the right side or the left side of the vehicle 1 can be adjusted to a height that is easy to get on and off. Further, when the user operation is received, the vehicle body is tilted toward the side designated by the user operation, so that the vehicle height on the desired side when the user desires can be adjusted to a height that is easy to get on and off.

In the above description, the vehicle 1 having a relatively high vehicle height has been described, but the vehicle control system 2 may be mounted on a vehicle such as a sports car having a relatively low vehicle height. Vehicles with relatively low vehicle heights may also be difficult for some people to get on and off. In the case of such a vehicle 1, the control unit 32 raises the vehicle height on the side where the user intends to get on and off in response to a user operation. When detecting that the doorknob on the outside or the inside of the door on the right side of the vehicle 1 has been operated, the first operation detection unit 16 supplies second operation information indicating that a user operation of tilting the vehicle body to the left side has been performed to the stabilizer control device 14. In this case, the control unit 32 inclines the vehicle body to the left side, lowers the vehicle height on the left side, and raises the vehicle height on the right side. As a result, the user can easily get into the seat on the right side from the right side of the raised vehicle body. When detecting that the doorknob on the outside or the inside of the door on the left side of the vehicle 1 has been operated, the second operation detection unit 18 supplies first operation information indicating that a user operation of tilting the vehicle body to the right side has been performed to the stabilizer control device 14. In this case, the control unit 32 inclines the vehicle body to the right side, raises the vehicle height on the left side, and lowers the vehicle height on the right side. As a result, the user can easily get into the seat on the left side from the left side of the raised vehicle body. The processing according to the user operation by the electronic key 40 and the like is the same as that of the above-described embodiment. Even in a vehicle having a relatively low vehicle height, the above-described effects of the embodiment can be obtained.

Second Embodiment

In the second embodiment, it is different from the first embodiment in that a user around the vehicle is detected, and the user further performs control of tilting the vehicle body to a side corresponding to the detected right side or left side. Hereinafter, differences from the first embodiment will be mainly described.

Figure 5:
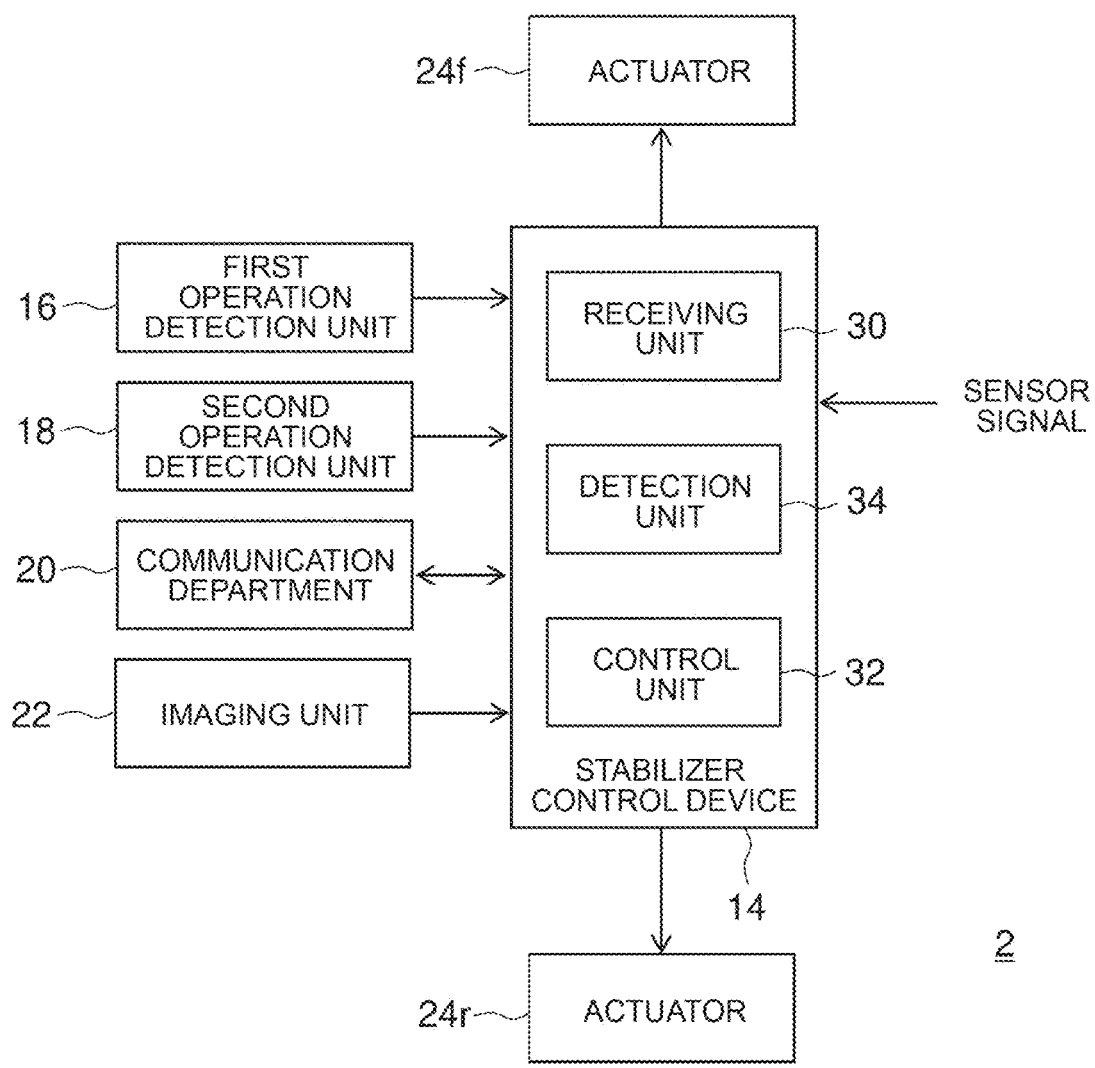
FIG. 5 is a block diagram illustrating a schematic configuration of a vehicle control system according to a second embodiment.

FIG. 5 is a block diagram illustrating a schematic configuration of the vehicle control system 2 according to the second embodiment. In FIG. 5, illustration of the left-hand stabilizer bar 26*f*L and the like is omitted. The vehicle control system 2 further includes an imaging unit 22 in addition to the configuration of the first embodiment.

The imaging unit 22 includes a plurality of cameras mounted around the vehicle body of the vehicle 1. Each of the plurality of cameras is capable of capturing an image of a front side, a rear side, a left side, or a right side of the vehicle 1. As the camera, various known cameras such as a digital camera incorporating an image sensor such as a charge coupled device (CCD) or a CMOS image sensor (CIS) can be used. The plurality of cameras may also be referred to as peripheral surveillance cameras. When the communication unit 20 successfully authenticates the electronic key 40 and the like while the vehicle 1 is parked, the imaging unit 22 starts capturing an image of the surroundings of the vehicle 1 and supplies the captured image to the stabilizer control device 14. The images of the surroundings of the vehicle 1 may include at least images of the left side and the right side of the vehicle 1. The imaging unit 22 does not need to capture an image until authentication of the electronic key 40 or the like is successful in the communication unit 20 while the vehicle 1 is parked. Thus, when a person who does not have the registered electronic key 40 or the like and who is not the user of the vehicle 1 approaches the vehicle 1, this person cannot be erroneously detected as a user.

When authentication of the electronic key 40 or the like is successful, the communication unit 20 detects the position of the electronic key 40 or the like with respect to the vehicle 1 in the position detection area by using wireless communication between the communication unit 20 and the electronic key 40 or the like. The position detection area may be set to be narrower than, for example, an area in which the communication unit 20 and the electronic key 40 can wirelessly communicate with each other. For example, when the communication unit 20 and the electronic key 40 can communicate with each other within substantially 10 m, the position detecting area may be within substantially 2 m from the communication unit 20. A known technique can be used to detect the position of the electronic key 40 or the like. The communication unit 20 supplies the detected positional information such as the electronic key 40 to the stabilizer control device 14.

The communication unit 20 is capable of communicating with each of a plurality of electronic keys 40 and the like registered in advance. In this case, the communication unit 20 can detect the respective positions of the plurality of electronic keys 40 and the like. The plurality of electronic keys 40 and the like may be carried one by one by, for example, the owner of the vehicle 1 and the family thereof.

The stabilizer control device 14 further includes a detection unit 34 in addition to the configuration of the first embodiment. The detection unit 34 detects a user around the vehicle 1 based on the position information of the electronic key 40 supplied from the communication unit 20 and the image supplied from the imaging unit 22.

When authentication of the electronic key 40 or the like is successful in the communication unit 20, the detection unit 34 detects a user around the vehicle 1 based on the image supplied from the imaging unit 22. The detection unit 34 identifies the position of the user in the vicinity of the left and right doors of the vehicle 1 by image recognition, detects that the user is present on the right side or the left side of the vehicle 1 or that a plurality of users is present on both left and right sides, and notifies the control unit 32 of the detection result. For example, the detection unit 34 may detect a user who is located within 1 to 2 m from each of the doors. Since the authentication of the electronic key 40 is successful, it is assumed that the detected user includes a user carrying the electronic key 40. Even in a situation where one user exists on each side of the vehicle 1 and only one user possesses the electronic key 40, the users on both sides of the vehicle 1 can be detected.

When the communication unit 20 detects that the electronic key 40 or the like is located on the side of the right side or the left side of the vehicle 1 where the user is not detected by the image recognition, the detection unit 34 may detect that the user is present on the side where the user is not detected by the image recognition. For example, in the case where the user is not detected on the left side in image recognition, but the electronic key 40 or the like is detected on the left side, the detection unit 34 may detect that the user is present on the left side. Further, for example, in the case where no user is detected in the image recognition, but it is detected that the electronic key 40 or the like is located on each of the left side and the right side, the detection unit 34 may detect that the user is present on the left side and the right side. As a result, it is possible to improve the detection accuracy of the user in a situation where the user is not properly imaged.

The control unit 32, as in the first embodiment, tilts the vehicle body in response to the reception of the user operation by the receiving unit 30. In addition, when the user is detected on the right side or the left side of the vehicle 1 by the detection unit 34, the control unit 32 operates the actuator 24 to tilt the vehicle body to the side corresponding to the side on which the user is detected. The side corresponding to the side on which the user is detected is predetermined. In the configuration in which the vehicle height on the side on which the user is going to get on and off is lowered as in the present embodiment, the side corresponding to the side on which the user is detected is the side on which the user is detected. That is, when the user is detected on the right side of the vehicle 1, the control unit 32 tilts the vehicle body to the right side. When the user is detected on the left side of the vehicle 1, the control unit 32 tilts the vehicle body to the left side.

When the detection unit 34 detects a user on both sides of the vehicle 1, the control unit 32 does not operate the actuator 24 and does not tilt the vehicle body. Even in a situation where the users are present on both sides of the vehicle 1 and only one of the users possesses the electronic key 40, the users on both sides of the vehicle 1 is detected by the image recognition so that the vehicle body is not tilted. In this case, a user who desires to adjust the vehicle height may operate a doorknob or the like.

For example, when a user having the electronic key 40 approaches the right side of the parked vehicle 1 and enters an area where wireless communication is possible, the imaging unit 22 starts imaging. At this time, the user may tilt the vehicle body by operating the button 42R of the electronic key 40, but may not operate it. When the user does not operate, the position of the electronic key 40 is detected by the communication unit 20 when the user further approaches the right side of the vehicle 1 and enters the position detecting area, and the position of the user is detected on the right side based on the captured images when the user enters within 1 to 2 m from the right side door. The vehicle body tilts to the right in response to the detection by the user. Therefore, the user can easily get on the vehicle without operating the electronic key 40.

The detection unit 34 may detect a user around the vehicle 1 without using the image captured by the imaging unit 22. The detection unit 34 detects that the user is present on the right side or the left side of the vehicle 1 or that a plurality of users is present on both left and right sides based on the positional information such as the electronic key 40 supplied from the communication unit 20, and notifies the control unit 32 of the detection result.

In this example, since the image recognition for detecting the user is unnecessary, the processing of the detection unit 34 can be simplified. The imaging unit 22 may not be provided. In this case, in a situation where the user is present on both sides of the vehicle 1 and only one of the users possesses the electronic key 40, the user is detected on the side where the electronic key 40 is located, and the vehicle height of the user who possesses the electronic key 40 is lowered. When the user who does not possess the electronic key 40 desires to adjust the vehicle height, the doorknob or the like may be operated. Also in this example, when a person who does not have the registered electronic key 40 or the like and who is not the user of the vehicle 1 approaches the vehicle 1, this person cannot be erroneously detected as a user.

Further, the detection unit 34 may detect a user around the vehicle 1 without using position information such as the electronic key 40. In this case, since the position of the electronic key 40 or the like does not need to be detected, the processing of the communication unit 20 can be simplified.

Figure 6:
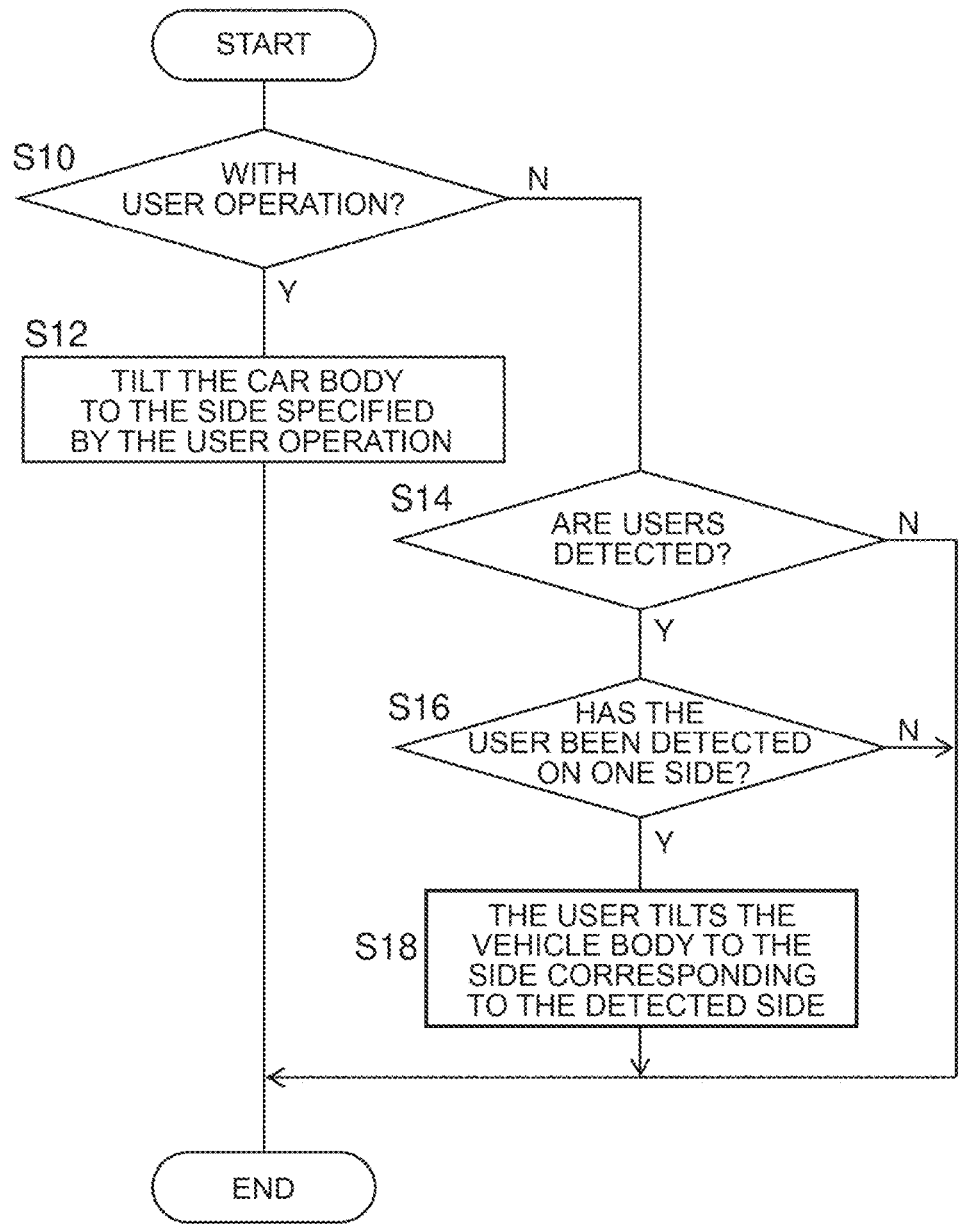
FIG. 6 is a flowchart illustrating processing of the stabilizer control device of FIG. 5.

FIG. 6 is a flowchart showing the processing of the stabilizer control device 14 of FIG. 5. The process of FIG. 6 is repeatedly executed. The processes of S10 and S12 are the same as those of the first embodiment. When there is no user manipulation (N in S10), if the user is detected by the detection unit 34 (Y in S14) and the user is detected on one side of the vehicle 1 (Y in S16), the control unit 32 inclines the vehicle body to the side corresponding to the side where the user is detected (S18). The stabilizer control device 14 ends the process.

When the user is not detected (N in S14), the stabilizer control device 14 ends the process. When the user is not detected on one side of the vehicle 1 (N in S16), that is, when the user is detected on both sides of the vehicle 1, the stabilizer control device 14 ends the process.

According to the second embodiment, the vehicle height on the approaching side is lowered by the user approaching the side where the vehicle 1 is to be boarded without performing a user operation for adjusting the vehicle height using the electronic key 40 or the like, so that the user can easily get into the vehicle and is highly convenient. In addition, since the vehicle height is lowered before the user extends his/her hand to the doorknob to open the door, convenience is high.

Note that, when the vehicle body is tilted in response to the detection by the detection unit 34 by the user, the control unit 32 may decrease the speed at which the vehicle body is tilted as compared with the case where the vehicle body is tilted in response to the reception of the user operation by the receiving unit 30. For example, when the time required to tilt the vehicle body in response to a user operation is 1 second, the time required to tilt the vehicle body in response to detection by the user may be 2 seconds. When the vehicle body is tilted in response to the detection by the user, there is a possibility that the vehicle body moves at an unintended timing or direction, but the user can be surprised by lowering the speed at which the vehicle body is tilted.

In addition, in a case where the vehicle height is relatively low and the vehicle height on the side where the user intends to get on and off is raised, the side corresponding to the side where the user is detected is the side opposite to the side where the user is detected. In this case, when the user is detected on the right side of the vehicle 1, the control unit 32 tilts the vehicle body to the left side. When the user is detected on the left side of the vehicle 1, the control unit 32 tilts the vehicle body to the right side. Therefore, without performing a user operation using the electronic key 40 or the like, the vehicle height on the approaching side increases only by the user approaching the side where the vehicle 1 is to be boarded, so that the vehicle can easily get on.

Furthermore, at the time of getting off, the detection unit 34 may detect the position of the user in the vehicle cabin of the vehicle 1. For example, the detection unit 34 can detect the position of the user based on a sensor signal of a seating sensor (not shown) or a captured image of a vehicle cabin camera (not shown). In this case, the control unit 32 may detect the user's intention to get off the vehicle based on various sensor signals. For example, when the ignition switch of the vehicle 1 is off, the shift lever of the vehicle 1 is in the parking range, and the parking brake is activated, the control unit 32 may detect that the user has an intention to get off the vehicle. Various known techniques can be used to detect the intention of getting off. When it is detected that the user has an intention to get off the vehicle, the control unit 32 may operate the actuator 24 when the detection unit 34 detects the user on the right side or the left side of the vehicle cabin, and tilt the vehicle body toward the side corresponding to the side where the user is detected. If only the driver is riding, the vehicle height can be adjusted before operating the doorknob. When it is detected that the user has an intention to get off the vehicle, the control unit 32 does not need to tilt the vehicle body without operating the actuator 24 when the detection unit 34 detects the user on both sides of the vehicle cabin.

Third Embodiment

In the third embodiment, when the user is detected on both sides of the vehicle, it is different from the second embodiment that the control of tilting the vehicle body to the side corresponding to the side having the higher priority among the right side and the left side is further executed. Hereinafter, differences from the second embodiment will be mainly described.

Figure 7:
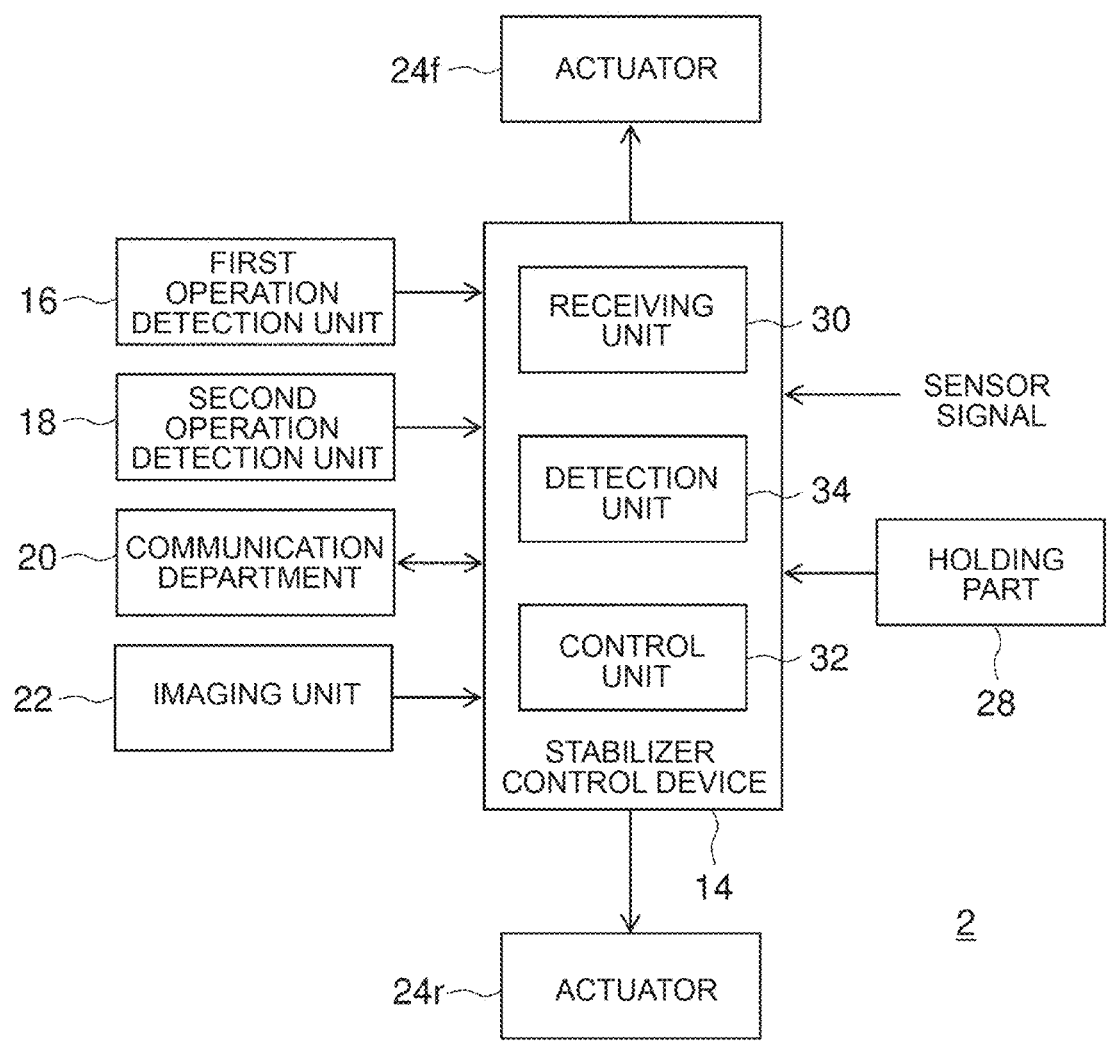
FIG. 7 is a block-diagram showing a schematic configuration of a vehicle-control system according to a third embodiment of the present disclosure.

FIG. 7 is a block diagram illustrating a schematic configuration of a vehicle control system 2 according to a third embodiment. In FIG. 7, illustration of the left-hand stabilizer bar 26*f*/L and the like is omitted. The vehicle control system 2 further includes a holding unit 28 in addition to the configuration of the second embodiment.

For example, the user operates a car navigation system (not shown) or the like mounted on the vehicle 1 to set priorities for each of the plurality of electronic keys 40 and the like in advance. As a result, the priority order is associated with each key identifier such as the plurality of electronic keys 40 and is held in the holding unit 28. For example, the priority may be set to the electronic key 40 or the like carried by the user who needs to adjust the vehicle height, and the priority may not be set to the electronic key 40 or the like carried by the user who does not need to adjust the vehicle height.

For example, the user may operate a car navigation system, an application of a mobile terminal, or the like to set a priority on the right side and the left side of the vehicle 1 in advance. The respective priorities of the right side and the left side are also held in the holding unit 28.

As in the first embodiment, the control unit 32 tilts the vehicle body in response to the reception of the user operation by the receiving unit 30. In addition, as in the second embodiment, when the user is detected on the right side or the left side of the vehicle 1 by the detection unit 34, the control unit 32 tilts the vehicle body to the side corresponding to the side on which the user is detected.

When a user is detected on both sides of the vehicle 1 by the detection unit 34, the control unit 32 identifies a side having a higher priority among the right side and the left side of the vehicle 1 based on the information on the priority order held in the holding unit 28.

When the user is detected on both sides of the vehicle 1 and the positions of the two electronic keys 40 and the like on both sides are identified, the control unit 32 identifies the side having the higher priority among the right side and the left side based on the priority associated with the key identifiers of the two identified electronic keys 40 and the like. If the priority is set only for one of the electronic keys 40 and the like, the control unit 32 identifies the position side of the electronic key 40 and the like for which the priority is set as the side having the higher priority.

When the user is detected on both sides of the vehicle 1 and the position of one electronic key 40 is specified, if the priority order is set on the right side and the left side, the control unit 32 specifies the side having the higher priority order based on the priority order set on the right side and the left side.

Note that in the configuration example in which the detection unit 34 detects the user around the vehicle 1 without using the image captured by the imaging unit 22, the following control may be performed. When the positions of the two electronic keys 40 on both sides of the vehicle 1 are identified, the control unit 32 identifies the right side and the left side having the highest priority based on the priority associated with the key identifiers of the two identified electronic keys 40.

Further, in the configuration example in which the detection unit 34 detects the user around the vehicle 1 without using the position information such as the electronic key 40, the control may be performed as follows. When the user is detected on both sides of the vehicle 1 from the captured image, if the priority order is set in advance on the right side and the left side, the control unit 32 identifies the side having the higher priority order based on the priority order set on the right side and the left side.

The control unit 32 tilts the vehicle body to the side corresponding to the side having the specified higher priority. The side corresponding to the side having the higher priority is predetermined. In the configuration in which the vehicle height on the side on which the user is going to get on and off is lowered as in the present embodiment, the side corresponding to the side having the higher priority is the side having the higher priority. That is, when the right-side priority is high, the control unit 32 inclines the vehicle body to the right side. The control unit 32 tilts the vehicle body to the left side when the priority order on the left side is high. Accordingly, in a situation where the user is present on both sides of the vehicle 1, the vehicle height on the side having the higher priority can be lowered, and thus the convenience is high.

The control unit 32 does not tilt the vehicle body when there is no priority information in the holding unit 28 and it is impossible to specify a side having a high priority.

The control unit 32 may incline the vehicle body to the side corresponding to the side having the higher priority, and then incline the vehicle body to the side corresponding to the side having the lower priority when it is detected that the user has ridden. Accordingly, in a situation where the user is present on both sides of the vehicle 1, the vehicle height can be lowered in order from the side having the higher priority to the side having the lower priority, and thus the convenience is high.

In a case where the control unit 32 cannot specify the side having the lower priority, it may eliminate the inclination of the vehicle body when it is detected that the user has ridden the vehicle body after tilting the vehicle body to the side corresponding to the side having the higher priority. The priority order is not set on the right side and the left side, and the priority order is not set on the electronic key 40 or the like carried by the user who does not need to adjust the vehicle height, so that the vehicle height is not automatically adjusted.

Figure 8:
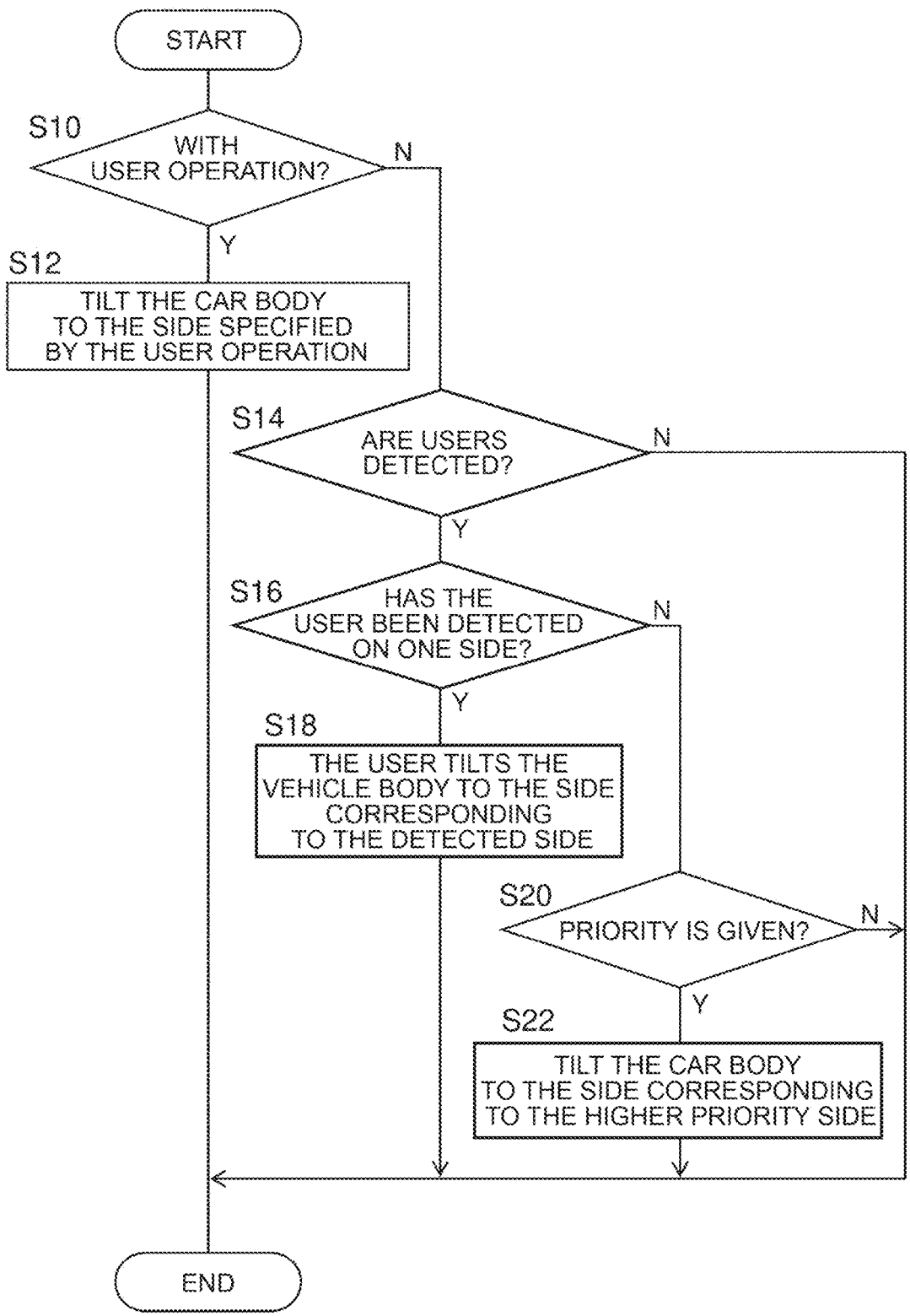
FIG. 8 is a flowchart illustrating processing of the stabilizer control device of FIG. 7.

FIG. 8 is a flowchart showing the processing of the stabilizer control device 14 of FIG. 7. The process of FIG. 8 is repeatedly executed. The process of S10 to S18 is the same as that of the second embodiment. When the user is not detected on one side of the vehicle 1 (N in S16), that is, when the user is detected on both sides of the vehicle 1, if the priority is given (Y in S20), the control unit 32 the vehicle body to the side corresponding to the side having the higher priority (S22). The stabilizer control device 14 ends the process. When the priorities are not assigned (N in S20), the stabilizer control device 14 ends the process.

Also in the present embodiment, when the vehicle body is inclined in response to the detection by the detection unit 34 by the user, the control unit 32 may decrease the speed at which the vehicle body is inclined as compared with the case where the vehicle body is inclined in response to the reception of the user operation by the receiving unit 30.

In addition, in a case where the vehicle height is relatively low and the vehicle height on the side where the user intends to get on and off is raised, the side corresponding to the side having the higher priority is the side opposite to the side having the higher priority. In this case, the control unit 32 tilts the vehicle body to the left side when the right side priority is high. When the priority on the left side is high, the control unit 32 tilts the vehicle body to the right side.

Further, in a case where it is detected that the user has an intention to get off the vehicle at the time of getting off, when the user is detected on both sides of the vehicle cabin of the vehicle 1 by the detection unit 34, the control unit 32 identifies a side having a higher priority among the right side and the left side of the vehicle 1 based on the priority information held in the holding unit 28. Then, the control unit 32 may incline the vehicle body to the side corresponding to the side having the specified higher priority.

The present disclosure has been described above based on the embodiment. It should be understood by those skilled in the art that the embodiment is merely an example, and that various modifications are possible in combination of each component and each process, and that such modifications are within the scope of the present disclosure.

For example, in each embodiment, the vehicle 1 does not include an air suspension or an active suspension, but may include an air suspension or an active suspension.

What is claimed is:

1. A stabilizer control device comprising
a control unit configured to operate an actuator of an active stabilizer of a vehicle and tilt a vehicle body of the vehicle to a right side or a left side when a user gets in and out of the vehicle;
a receiving unit configured to receive a user operation for tilting the vehicle body to the right side or the left side, wherein the control unit is configured to, when the user operation is received by the receiving unit, tilt the vehicle body to a side specified by the user operation; and
a detection unit configured to detect the user around the vehicle, wherein the control unit is configured to, when the user is detected on the right side or the left side of the vehicle by the detection unit, tilt the vehicle body to a side corresponding to a side where the user is detected,
wherein the control unit is configured to, when users are detected on both sides of the vehicle by the detection unit, determine a side having a higher priority level out of the right side and the left side of the vehicle, and tilt the vehicle body to a side corresponding to the determined side having the higher priority level.

2. A stabilizer control device comprising
a control unit configured to operate an actuator of an active stabilizer of a vehicle and tilt a vehicle body of the vehicle to a right side or a left side when a user gets in and out of the vehicle; and
a receiving unit configured to receive a user operation for tilting the vehicle body to the right side or the left side, wherein the control unit is configured to, when the user operation is received by the receiving unit, tilt the vehicle body to a side specified by the user operation; and
a detection unit configured to detect the user around the vehicle, wherein the control unit is configured to, when the user is detected on the right side or the left side of the vehicle by the detection unit, tilt the vehicle body to a side corresponding to a side where the user is detected,
wherein the control unit is configured to, in a case of tilting the vehicle body in response to detection of the user by the detection unit, reduce a tilt speed of the vehicle body as compared with a case of tilting the vehicle body in response to reception of the user operation by the receiving unit.

* * * * *